(12) United States Patent
Watanabe et al.

(10) Patent No.: US 7,568,824 B2
(45) Date of Patent: Aug. 4, 2009

(54) VEHICLE LIGHTING DEVICE

(75) Inventors: Shigeyuki Watanabe, Shizuoka (JP);
Tetsuaki Inaba, Shizuoka (JP);
Tatsuhiko Yamamichi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/635,598

(22) Filed: Dec. 8, 2006

(65) Prior Publication Data
US 2007/0133220 A1    Jun. 14, 2007

(30) Foreign Application Priority Data
Dec. 8, 2005    (JP) .............................. 2005-354580

(51) Int. Cl.
*B60Q 1/04*    (2006.01)
(52) U.S. Cl. ...................... 362/538; 362/520; 362/267; 362/310
(58) Field of Classification Search ................. 362/538, 362/507, 306, 310, 311, 520, 546, 267, 514; 264/1.36, 1.1
See application file for complete search history.

(56) References Cited

U.S. PATENT DOCUMENTS

| | | | | |
|---|---|---|---|---|
| 4,447,862 A | * | 5/1984 | Shanks | 362/267 |
| 4,544,998 A | * | 10/1985 | Shanks | 362/267 |
| 6,017,141 A | * | 1/2000 | Sugiyama et al. | 362/520 |
| 6,086,231 A | * | 7/2000 | Kenjo et al. | 362/507 |
| 6,382,818 B1 | * | 5/2002 | Iwama et al. | 362/374 |
| 6,464,374 B2 | * | 10/2002 | Akiyama et al. | 362/267 |
| 2004/0223125 A1 | * | 11/2004 | Tamaru et al. | 353/119 |
| 2006/0114687 A1 | * | 6/2006 | Yamamoto | 362/514 |

FOREIGN PATENT DOCUMENTS

| | | |
|---|---|---|
| JP | 2000-100214 A | 4/2000 |
| JP | 2005-166588 A | 6/2005 |

* cited by examiner

*Primary Examiner*—Jacob Y Choi
*Assistant Examiner*—Robert May
(74) *Attorney, Agent, or Firm*—Sughrue Mion, PLLC

(57) ABSTRACT

A vehicle lighting device with a lamp compartment having a light source unit disposed therein. The light source unit includes a light emitting device as a light source and a projection lens as a light distribution control member for distributing light. A face bearing portion at a distal end of a lens mounting portion of the light emitting device corresponds to a rear surface of a collar portion disposed along an outer circumference of the projection lens. Complimentary extending projections and stepped portions on the collar portion and lens mounting portion are ultrasonically welded together, and burrs formed during the welding process are prevented from protruding toward the optical axis by an erect wall of the stepped portion.

10 Claims, 12 Drawing Sheets

VEHICLE LIGHTING DEVICE

CROSS-REFERENCE TO RELATED APPLICATIONS

This application claims priority to Japanese Patent Application No. 2005-354580, filed Dec. 8, 2005, in the Japanese Patent Office. The priority application is incorporated by reference in its entirety.

BACKGROUND OF THE INVENTION

1. Field of the Invention

The present invention relates to a vehicle lighting device in which a light source unit including at least a light emitting device as a light source and a projection lens as a light distributing member for distributing light from the light source forward are provided in a lamp compartment. More particularly, the present invention relates to a vehicle lighting device that forms a predetermined light distribution pattern by combining light beam patterns emitted from a plurality of light source units provided in the lamp compartment.

2. Description of the Background Art

In general, as an example, a vehicle headlamp is configured to form a low beam light distribution pattern having a cut-off line along an upper edge of the pattern, whereby a forward visibility for the driver of the subject vehicle is secured as much as possible while suppressing the generation of glare to the driver of an oncoming vehicle or the like.

The following discussion refers to two background vehicle headlamps disclosed in JP-A-2005-166588 (hereinafter "Patent Document No. 1") and JP-A-2000-100214 (hereinafter "Patent Document No. 2").

In recent years, there has been a vigorous tendency to develop vehicle headlamps which use light emitting devices as light sources. Patent Document No. 1 discloses a vehicle headlamp in which a plurality of light source units using light emitting devices as their light sources are provided in a lamp compartment and a low beam light distribution pattern is formed by overlapping respective light beam patterns formed by the light source units so provided.

As is shown in FIG. 12, each light source unit is made up of a light distribution control member and a light emitting device 2 as a light source. The light distribution control member includes a reflector 7, a shade 6 for forming a cut-off line, and a projection lens 4. The light source unit is mounted integrally on a front side of a bracket 1, which makes up a unit support member.

Since light of the light emitting device 2 used as the light source has little heat, the projection lens 4 and the cut-off line forming shade 6 can be made from a synthetic resin with a view to reducing the weight thereof. The bracket 1, which is the unit support member on which the light emitting device 2 is mounted, can be made of a die-cast metallic product having a good heat conductive property with a view to suppressing the increase in temperature of the light emitting device 2, which could lead to the reduction in the life of the light emitting device 2. High temperatures can cause the light emitting device to eventually experience a reduction in light flux and/or change in the color of light emitted from the light emitting device 2.

An acrylic resin lens 4 and a polycarbonate resin shade 6 may be integrated into a single unit by insert molding. The resin shade 6 and the metallic bracket 1 may be fastened together with a metallic fastening screw 8. A bracket 7a of the reflector 7 and a bracket of the shade 6 may also be fastened together with the fastening screw 8.

Although it does not disclose a projection type lamp in which light is projected and distributed by a projection lens as disclosed in Patent Document No. 1, Patent Document No. 2 discloses a reflection type headlamp which forms a predetermined light distribution pattern by reflecting light from a light source by a reflector, and this reflection type headlamp has a lamp construction in which a resin outer lens that is to be assembled to a front opening in a resin housing is fixed to the resin housing by means of ultrasonic welding.

A vehicle headlamp, such as shown in Patent Document No. 1 above, in which a low beam light distribution pattern is formed by overlapping light beam patterns formed by a plurality of light source units, requires positional accuracy between the resin lens 4 and shade 6 which are the light distribution control members. Such a vehicle headlamp also requires that the positional accuracy of the light distribution control members (i.e., the lens 4 and the shade 6) relative to the bracket 1 be maintained. Namely, respective optical axes of the light source units need to be aligned. Due to this, a construction is adopted in which a plurality of positioning projections 6b are provided on an abutment surface of the shade 6 against the bracket 1 in order to secure a positional accuracy of the light distribution control members (i.e., the lens 4 and the shade 6) relative to the bracket 1.

In Patent Document No. 1, however, the resin lens 4 and resin shade 6 are integrated into the single unit by means of insert molding. As a result, a mold for integrally molding both the lens 4 and the shade 6 is complex, and large-sized molding equipment becomes necessary, resulting in an increase in production cost.

To cope with this, the inventor considered that as with Patent Document No. 2, in the event that the resin projection lens 4 and the resin shade 6 are formed into an integrated unit by welding such as ultrasonic welding, there is no need for a complex mold for integrating both the lens 4 and the shade 6 into a single unit, nor is large-sized molding equipment necessary. Therefore, the increase in production cost is suppressed.

However, in the event that the resin lens 4 and the resin shade 6 are integrated into the single unit by means of welding, burrs produced at the weld between the lens and the shade protrude (i.e., are exposed) towards an optical axis side of the lens 4, whereby the light distribution is adversely affected or the burrs become visible through the lens 4, such that the appearance of the headlamp when not lit is deteriorated.

The inventor next considered a construction in which a projection is formed on a rear surface side of the resin lens 4, while a stepped portion is formed on an outer circumference of a distal end portion of the resin shade 6 as a lens abutment portion so that the projection on the lens 4 is brought into longitudinal engagement therewith. The projection on the lens 4 and the stepped portion on the shade 6 are welded together so that the lens 4 and the shade 6 are integrated. An inner circumferential side of the stepped portion of the shade 6 functions as a barrier to prevent fused resin produced at the time of welding from flowing out towards the optical axis side of the lens 4. In other words, the fused resin does not protrude towards the optical axis side of the lens 4 to thereby avoid the protrusion of burrs. The inventor produced this construction as an experiment to study the effectiveness thereof and confirmed that the construction was effective, leading to the filing of the instant application.

SUMMARY OF THE INVENTION

The invention in the present application was made in view of the problems in the related art described above and based on the knowledge of the inventor so obtained, and an object thereof is to provide an automotive lamp which includes a light source unit which enables a simple and accurate integration of a resin lens with a resin lens mounting portion, which are both light distribution control members, by means of welding, in place of the insert molding which has been used conventionally, and which is free from a defect in which burrs produced at the weld protrude towards the optical axis side of the lens.

According to a first aspect of the invention, there is provided a vehicle lighting device having provided in a lamp compartment a light source unit including at least a light emitting device as a light source and a projection lens as a light distribution control member for distributing light from the light source forwards, the projection lens, which is made from a resin, being mounted on a lens mounting portion made from a resin which extends forwards from the light emitting device. A face bearing portion may be formed at a distal end of the lens mounting portion so as to correspond to a rear surface of a collar portion formed along an outer circumference of the projection lens. A plurality of extending projections may be provided on an outer circumferential side of either of the rear surface of the collar portion and the face bearing portion so as to be welded to be fixed to the other, while a plurality of stepped portions may be formed on an outer circumferential side of the other so as not only to be brought into axial engagement with the plurality of extending projections with an optical axis of the projection lens aligned substantially with a longitudinal axis of the lens mounting portion, but also to make up erect walls which lie along insides of the extending projections. The extending projections and the stepped portions may be welded together so that the rear surface of the collar portion and the face bearing portion are brought into longitudinal abutment with each other.

Equipment for welding the extending projections and stepped portions together so that the collar portion of the projection lens and the face bearing portion of the lens mounting portion are brought into axial (longitudinal) abutment with each other becomes simple in construction, small in size and hence inexpensive in cost, compared to the complex and large-sized mold equipment for insert molding the projection lens and the lens mounting portion.

From the longitudinal abutment of the rear surface of the collar portion formed along the outer circumference of the projection lens with the face bearing portion formed at the distal end of the lens mounting portion, the optical axis of the projection lens and the longitudinal axis of the lens mounting portion are positioned parallel to each other.

Secondarily, the focal point of the projection lens and a predetermined position of the lens mounting portion are aligned with each other in the longitudinal direction, whereby a desired light distribution can be obtained by the light source unit.

Note that although the focal point of the projection lens and the predetermined position of the lens mounting portion can be aligned substantially with each other vertically and horizontally by bringing the plurality of extending projections on the projection lens (or the lens mounting portion) side into axial engagement with the corresponding stepped portions on the lens mounting portion (or the projection lens) side, they cannot necessarily be aligned with each other accurately. However, in forming a desired light distribution by the light source unit, there is no serious problem even though the focal point of the projection lens and the predetermined position of the lens mounting portion side deviate from each other somewhat vertically and/or horizontally, provided at least that the optical axis of the projection lens and the longitudinal axis are parallel, and the focal point of the projection lens and the predetermined position on the lens mounting portion side are aligned in the longitudinal direction. However, since it is better that the focal point of the projection lens and the predetermined position on the lens mounting portion side are aligned vertically and horizontally, the plurality of extending projections and the corresponding stepped portions are disposed diametrically across the optical axis of the lens, whereby the focal point of the projection lens and the predetermined position on the lens mounting portion side can be aligned substantially with each other vertically and horizontally more assuredly.

In addition, the erect wall formed on the stepped portion on the lens mounting portion (or the projection lens) extends along the inside of the extending projection on the lens (or the lens mounting portion) and functions as a barrier which prevents resin fused when the extending projection is welded to the stepped portion from flowing towards the optical axis side of the projection lens, so as to prevent the protrusion of burrs produced at the weld between the extending projection and the stepped portion towards the optical axis of the projection lens, thereby avoiding defects such as burrs at the weld. Consequently, there is no chance that burrs at the weld will adversely affect the light distribution or become visible through the projection lens.

According to a second aspect of the invention, a vehicle lighting device as set forth in the first aspect of the invention is provided, wherein the extending projections and the stepped portions are both disposed at substantially equal intervals in a circumferential direction of the projection lens. Since the projection lens and the lens mounting portion are welded and fixed to each other at a plurality of locations which lie at substantially equal intervals in the circumferential direction, the fixing of the projection lens to the lens mounting portion is ensured.

In particular, in the event that the extending projections and the stepped portions are disposed, respectively, at three locations which lie in the circumferential direction at substantially equal intervals, the fixing of the projection lens to the lens mounting portion is ensured further. In addition, due to the extending projections and the stepped portions being welded together at the three locations which lie in the circumferential direction at substantially equal intervals and abutment points between the collar portion and the face bearing portion being provided at three locations lying in the vicinity of the welds between the extending projections and the stepped portions, the parallelism between the optical axis of the projection lens and the longitudinal axis of the lens mounting portion can be secured further, and the longitudinal positioning of the focal point of the projection lens and the predetermined position on the lens mounting portion side is secured further, whereby a more desired light distribution (for example, a light distribution having a clear cut-off line which corresponds to the low beam forming shade) can be obtained by the light source unit.

According to a third aspect of the invention, a vehicle lighting device as set forth in the first or second aspect of the invention is provided, wherein a vertical and horizontal positioning means is provided between the rear surface of the collar portion and the face bearing portion in which a pair of projecting pins provided on either of the rear surface of the collar portion and the face bearing portion so as to extend axially and a pair of engagement holes provided on the other so that the projecting pins are brought into engagement therewith are each disposed so that one of the pair faces the other substantially diametrically across the optical axis of the projection lens or the longitudinal axis of the lens mounting portion. For example, the vertical and horizontal positioning means for positioning the projection lens relative to the lens mounting portion is made up of the pair of projecting pins provided on the rear surface side of the collar portion and the pair of pin engagement holes provided on the face bearing portion side When the pair of projecting pins is brought into engagement with the pin engagement holes, the vertical and horizontal positioning of the projection lens relative to the lens mounting portion is automatically implemented. That is, the optical axis of the projection lens and the longitudinal axis of the lens mounting portion are aligned with each other.

In addition, since the pair of projecting pins and the pair of pin engagement holes which make up the vertical and horizontal positioning means are each disposed diametrically oppositely on a straight line which diametrically passes across the optical axis of the projection lens and the longitudinal axis of the lens mounting portion, the vertical and horizontal positioning of the projection lens relative to the lens mounting portion becomes highly accurate.

In the construction in which the pair of projecting pins and the pair of pin engagement holes are provided, since the projecting pins and the pin engagement holes cannot be brought into engagement with each other in the event that the positions thereof deviate from each other even slightly, a high dimensional accuracy is required for the pin projecting positions which lie diametrically across the optical axis of the projection lens and the pin engagement hole forming positions which lie diametrically across the longitudinal axis of the lens mounting portion. However, in the event that one of the pair of pin engagement holes is made up of an elongate hole or slit which extends radially, since the pin and the elongate hole or slit can slide in a radial direction of the projection lens relative to each other when the pin and the elongate hole or slit are brought into engagement with each other, the pin can easily be brought into engagement with the pin engagement hole (e.g., an elongate hole or slit) and also a dimensional error between the pin projecting position and the pin engagement hole forming position in the radial direction of the projection lens can be absorbed. Consequently, the dimensional accuracy required for both the pin projecting position and the pin engagement hole forming position is mitigated.

According to a fourth aspect of the invention, a vehicle lighting device as set forth in any of the first to third aspects of the invention is provided, wherein the extending projection and the stepped portion are welded together axially by means of ultrasonic vibrations. The ultrasonic vibration welding is performed until the collar portion and the face bearing portion reach an abutment position where they are brought into abutment with each other such that the extending projection which is formed slightly longer than a longitudinal length of the stepped portion and a welding surface of the stepped portion are held contacting each other under pressure in the longitudinal direction. When ultrasonic vibrations are transmitted to the press contact portion between the extending projection and the welding surface of the stepped portion while they are held in contact, via a vibration transmitting member (e.g., a horn) and the collar portion of the projection lens, the press contact portion between the extending projection and the welding surface of the stepped portion where ultrasonic vibration energy is received is fused, and a fused distal end portion of the extending projection is coalesced with the welding surface of the stepped portion which is similarly fused so that the extending projection and the stepped portion are welded together. However, since the extending projection and the welding surface of the stepped portion are pressed against each other until the collar portion and the face bearing portion reach the abutment position, the projection lens and the lens mounting portion can be welded together axially into an integrated unit relatively quickly and with good positional accuracy.

According to the vehicle lighting device of the first aspect of the invention, since the protrusion of burrs produced at the welds between the projection lens and the lens mounting portion in the welding process towards the optical axis side of the projection lens is prevented by the erect walls formed on the stepped portions of the lens mounting portion or the projection lens, the vehicle lighting device obtains a proper light distribution which is not adversely affected by the burrs at the welds and provides a good appearance when the lamp is not lit.

According to the second aspect of the invention, since the fixing of the projection lens to the lens mounting portion is secured further, the mounting strength of the projection lens on the lens mounting portion is enhanced accordingly.

According to the third aspect of the invention, since the projection lens and the lens mounting portion are welded and fixed to each other with high positional accuracy such that the optical axis of the projection lens and the longitudinal axis of the lens mounting portion align vertically and horizontally, the vehicle lighting device obtains a proper light distribution by the light source unit. In particular, although the invention is not so limited, the invention is effective for a vehicle lighting device in which a plurality of light source units are provided, whereby a predetermined low beam light distribution pattern is formed by combining proper light beam patterns of the plurality of light source units.

According to the fourth aspect of the invention, since the projection lens and the lens mounting portion can be welded together axially with good positional accuracy in a short period of time into the integrated unit, the vehicle lighting device is provided inexpensively and obtains the proper light distribution which is not adversely affected by the burrs at the welds and provides a good appearance when the lamp is not lit.

DETAILED DESCRIPTION OF PREFERRED EMBODIMENTS OF THE INVENTION

Figure 1:
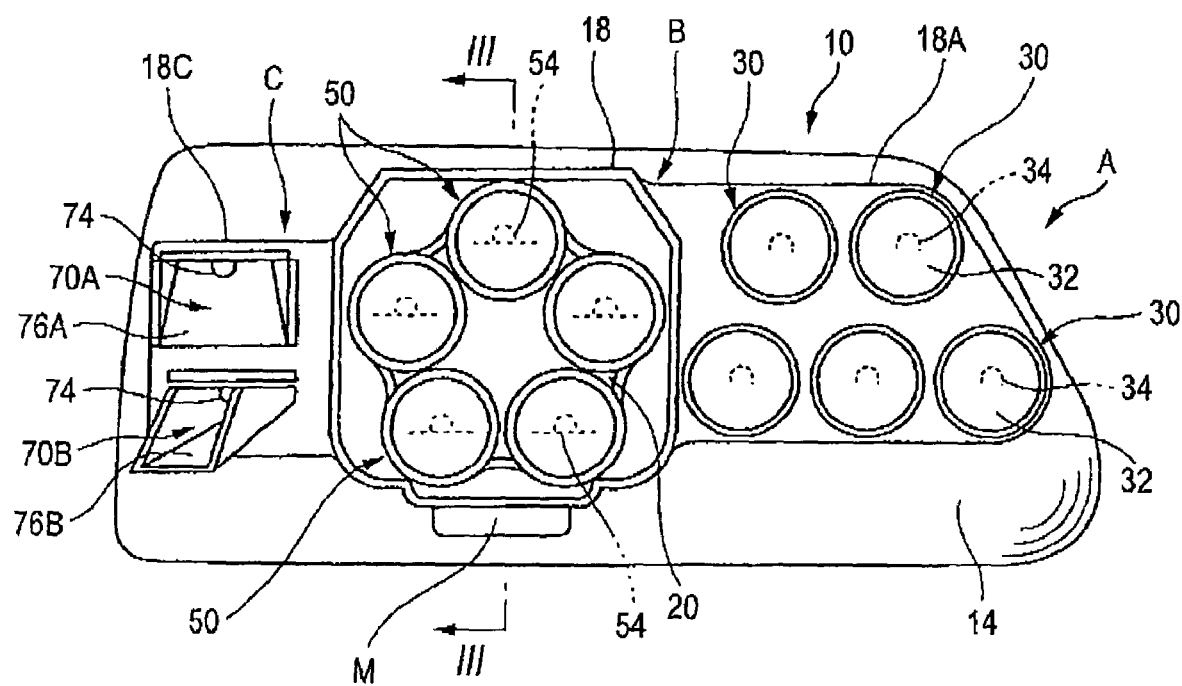
FIG. 1 shows a front view of a vehicle lighting device in accordance with an embodiment of the invention.

Hereinafter, a mode for carrying out the invention is described based on preferred embodiments thereof.

FIGS. 1 to 10 show a vehicle lighting device in accordance with a preferred embodiment of the invention.

In these figures, a vehicle lighting device 10 is a lamp that is provided on a right-hand side (as viewed from the driver's seat) of a front end portion of a vehicle and is constructed so as to accommodate a high beam lamp A, a low beam lamp B and a bending lamp C in that order as viewed from inside thereof in a lamp compartment S which is defined by a lamp body 12 and a clear transparent cover 14 mounted on a front end opening in the lamp body 12. In this preferred embodiment, the high beam lamp A is made up of five light source units in total which each use a light emitting device 34 as a light source and which are disposed in two upper and lower stages, so as to form a high beam light distribution pattern by combining respective light beam patterns of the light source units 30. In this preferred embodiment, the low beam lamp B is made up of five light source units 50 which each use a light emitting device 54 as a light source and which are arranged annularly, so as to form a low beam light distribution pattern by combining respective light beam patterns of the light source units 50. The bending lamp C may, for example, include two light source units 70 (70A, 70B) which include reflectors 76 (76A, 76B) on which light emitting devices 74, 74, as light sources, are mounted and which are arranged vertically, so as to form a curb beam light distribution pattern by combining respective beam patterns of the light source units 70A, 70B.

Figure 2:
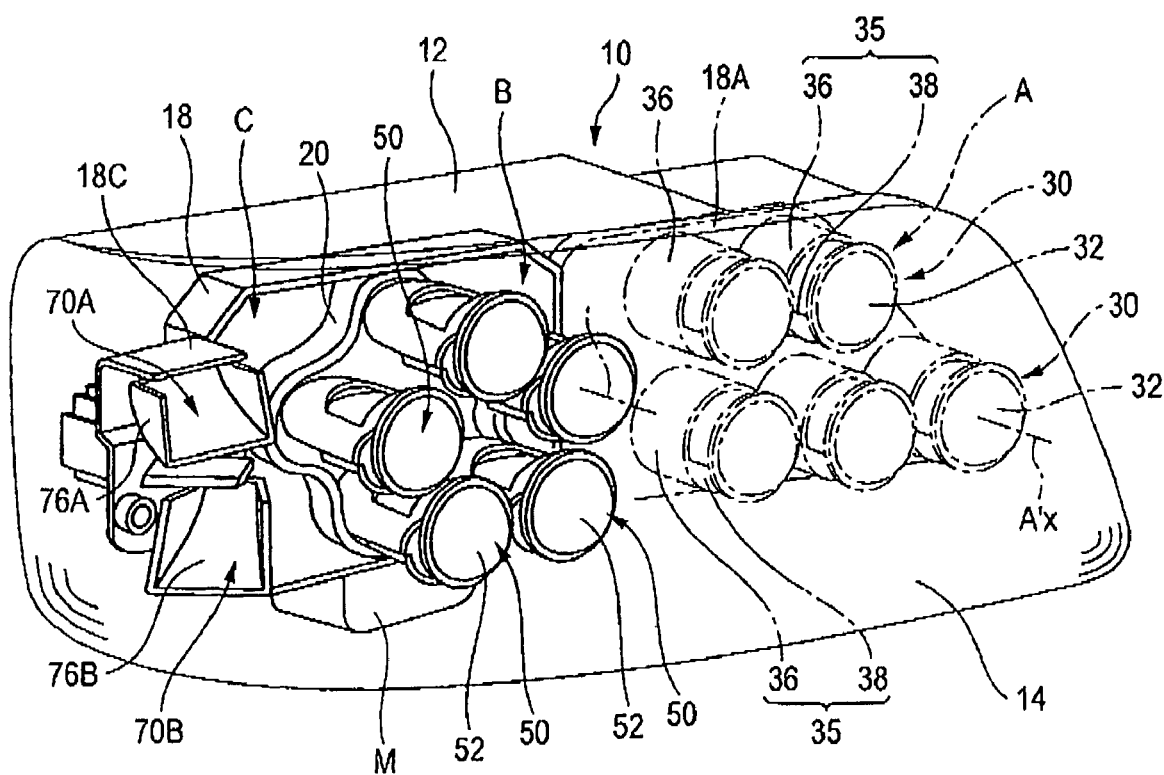
FIG. 2 shows a perspective view of the vehicle lighting device shown in FIG. 1.

Projection lenses 32, 52 and a extension reflector 16 in which an opening 16a is formed so as to correspond to the reflector 76 are provided, respectively, on a front side of the light source units 30, 50, 70 within the lamp compartment S along the transparent cover 14 so as not only to conceal respective perimeters of the light source units but also to allow the whole of the inside of the lamp compartment S to be seen in the color of a mirror surface. In FIGS. 1, 2, the illustration of the extension reflector 16 is omitted.

The light source unit 30, which makes up the high beam lamp A, and the light source unit 50, which makes up the low beam lamp B, are configured as projector-type light emitting units having the projection lenses 32, 52 for projecting light at front end portions thereof, respectively. The two light source units 70 (i.e., upper light source unit 70A and lower light source unit 70B), which make up the bending lamp C, are each configured as a reflector-type light emitting unit for distributing light by reflecting light from the light source by the reflector 76.

A die-cast aluminum low beam lamp bracket 20 on which the light source unit 50 making up the low beam lamp B is mounted integrally is supported on a die-cast aluminum lamp housing 18 which is formed into a rectangular shape so as to rotate horizontally relative thereto. The lamp housing 18 is configured as a die-cast aluminum product in which a lamp bracket 18A for the high beam lamp A and a lamp bracket 18C for the bending lamp C are formed integrally to sides thereof and is supported so as to be tilted vertically and horizontally relative to the lamp body 12 for adjustment of beam direction by an aiming mechanism (e.g. an aiming screw and a pivot fulcrum).

A swivel motor M is disposed on a lower wall 18a (refer to FIG. 3) of the lamp housing 18, and an output shaft of the motor M is connected to a lower portion of the low beam lamp bracket 20, so that the low beam lamp B (see the low beam lamp bracket 20 on which the light source unit 51 is mounted integrally) can swivel around a swivel axis (a perpendicular axis) Lz. For example, the driving of the motor M is controlled so as to correspond to a steering angle of a steering wheel by a motor driving control circuit, not shown, so that a horizontal direction of an optical axis (i.e., a light emitting direction) of the low beam B is changed in association with a change in the steering angle of the steering wheel thereby improving visibility when the vehicle is running on a bend.

Figure 3:
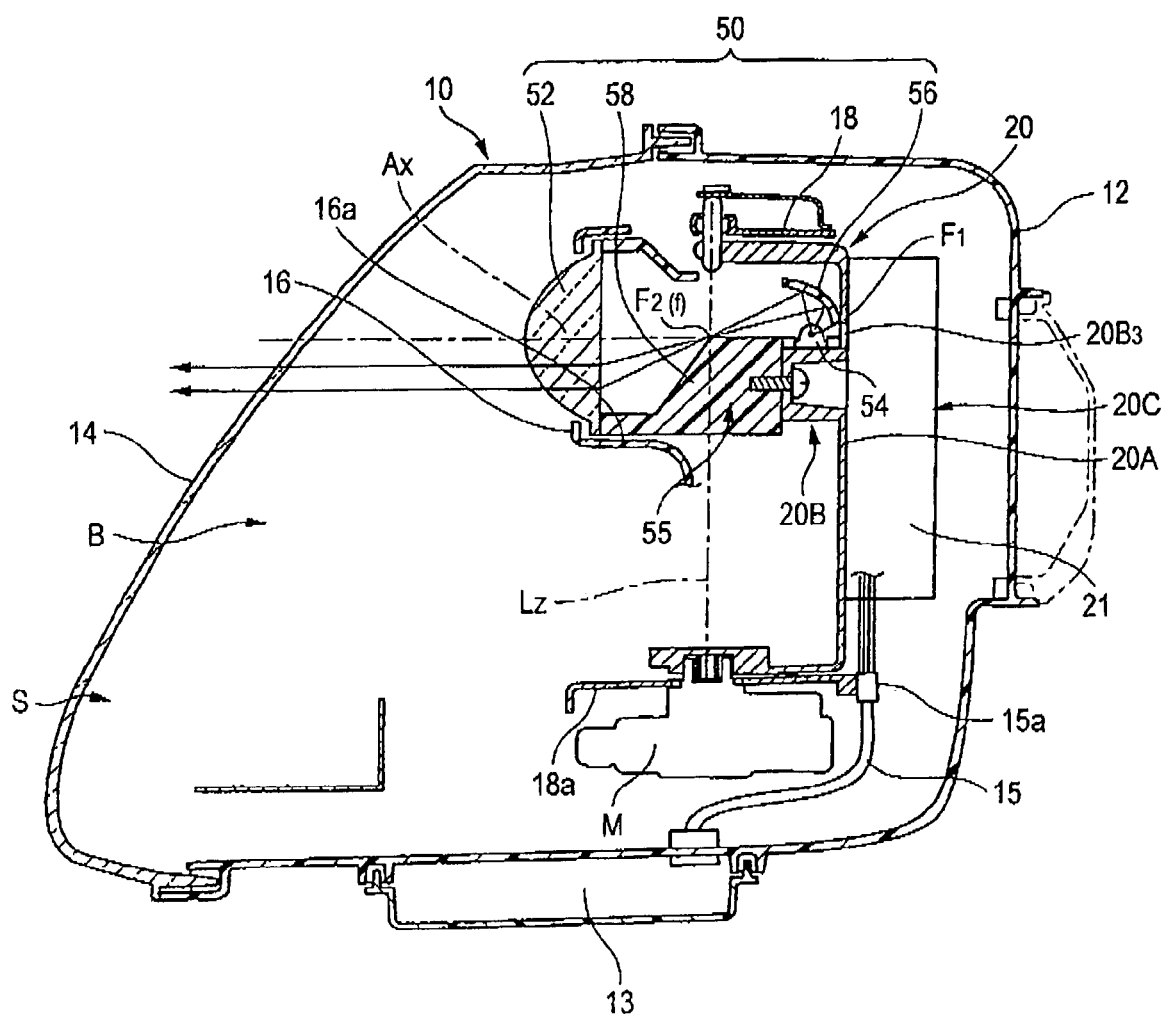
FIG. 3 shows a vertical sectional view of the vehicle lighting device shown in FIG. 1 (i.e., a sectional view taken along the line III-III shown in FIG. 1).
Figure 4:
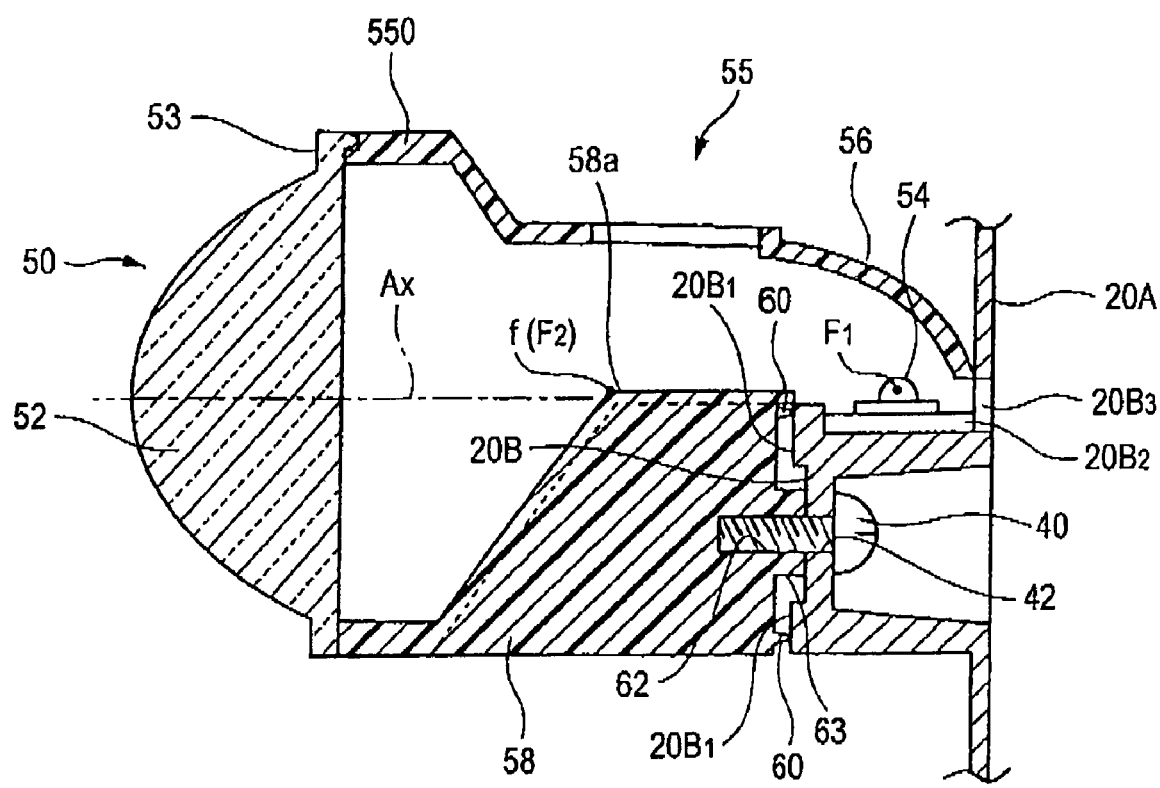
FIG. 4(a) shows an enlarged vertical sectional view of a light source unit which makes up a low beam lamp.
FIG. 4(b) shows a perspective view of a rear side of a reflector integrated shade which is a light distribution control member making up the light source unit with a front end side thereof partially omitted.
Figure 4:
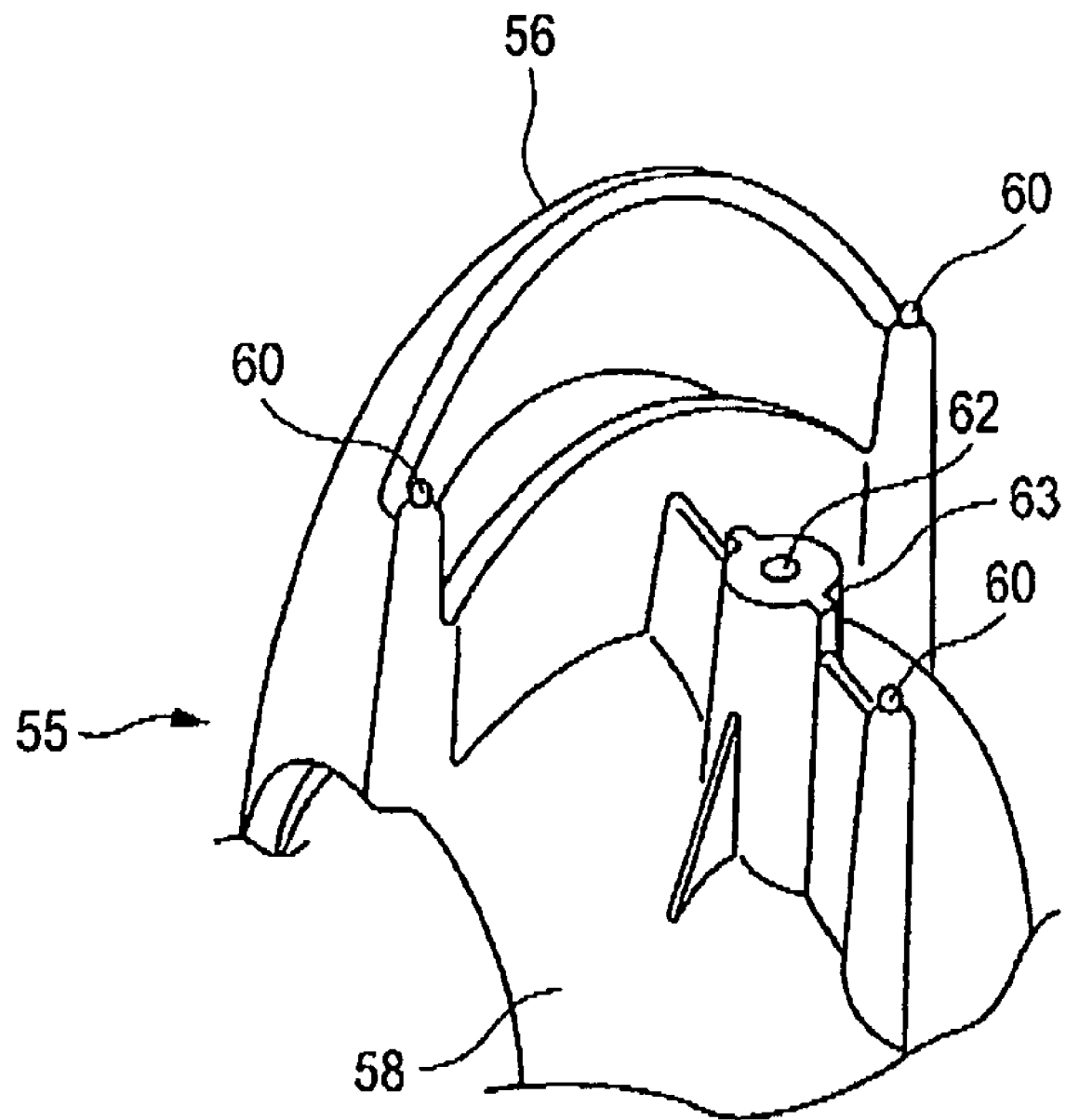

The die-cast aluminum high beam lamp bracket 18A on which the light source unit 30 is mounted integrally and the die-cast aluminum bending lamp bracket 18C on which the light source units 70 are mounted integrally are formed integrally to the sides of the housing 18, which rotatably supports the low beam lamp bracket 20 on which the light source unit 50 is mounted integrally As is shown in FIG. 3, the low beam lamp bracket 20 includes a perpendicular panel portion 20A, unit mounting portions 20B, which extend forward in a shelf-like fashion from the perpendicular panel portion 20A at five locations which lie at equal intervals in a circumferential direction thereof, and a plurality of heat dissipating fins 21 provided on a rear surface side of the perpendicular panel portion 20A so as to extend vertically. Furthermore, heat sink portions (not shown) made up of heat dissipating Ems may also be provided on the high beam lamp bracket 18A and the bending lamp bracket 18C (refer to FIGS. 1, 2).

The respective light emitting devices 34, 54, 74 of the light source units 30, 50, 70 are each configured as an LED assembly in which a white light emitting diode is accommodated within a synthetic resin assembly case. Although the light emitting devices generate heat when lit, since the light emitting devices 34, 54, 74 are mounted respectively on the bracket 18A, the bracket 20, the bracket 18C formed of die-cast aluminum products, heat generated in the light emitting devices 34, 54, 74 can be transmitted quickly to the bracket 18A, the bracket 20 and the bracket 18C, each having a large heat capacity, through a heat conducting action. The dissipation of heat to a space within the lamp compartment is further promoted by the heat dissipating fins 21, so as to suppress the increase in temperature of the light emitting devices 34, 54, 74. In addition, by adopting this configuration, the reduction in light flux and discoloration of light emitted from the light emitting devices 34, 54, 74 can be suppressed effectively.

In addition, a lighting circuit unit 13, in which circuits for controlling the lighting of the respective light emitting devices 34, 54, 74 of the lamps A, B, C are accommodated integrally, is provided on a lower surface of the lamp body 12. Feeding cords 15, which are introduced into an interior of the lamp compartment S from the lighting circuit 13 (refer to FIG. 3), extend to the light emitting devices 34, 54, 74 of the lamps A, B, C, respectively. In particular, since the feeding cord 15 which extends to the light emitting device 54 in the low beam lamp B is, as shown in FIG. 3, supported by a cord clamp 15a which is provided on the lower wall 18a of the housing 18 in the vicinity of the swivel axis Lz, there is no risk that the cord will interfere with other members due to the rotation of the low beam lamp B.

Next, a specific configuration of the light source unit 50 will be described.

As is shown in FIGS. 3, 4(a), and 4(b), the light source unit 50 includes the resin projection lens 52 which is a light distribution control member disposed on an optical axis Ax, the light emitting device 54 (e.g., a white light emitting diode) which is a light source disposed rearward of the projection lens 52 so as to be oriented upwards, a resin reflector 56 which is a light distribution control member disposed so as to cover above the light emitting device 54, and a resin cut-off line forming shade member 58 which is a light distribution control member disposed between the light emitting device 54 and the projection leis 52. The light source unit 50 is mounted integrally on tie low beam lamp bracket 20 at the unit mounting portions 20B thereof.

The reflector 56 and the shade member 58 are configured as a reflector integrated shade 55 which is an integrated mold product of polycarbonate resin or acrylic resin. The reflector integrated shade 55 is configured such that the light emitting device 54 is disposed at a primary focal point F1 of the reflector 56 which is made up of an elliptical reflecting surface, while a cut-off line forming upper edge portion 58a of the shade member 58 is positioned at a secondary focal point F2 of the reflector 56.

As is shown in FIGS. 4(a) and 4(b), positioning projections 60 are provided on a back side of the reflector integrated shade 55 at three locations in total which include two locations at left and right upper portions and one location at a transversely central lower portion thereof, so as to set a perpendicular reference surface (plane) on the shade 55 side. In addition, a boss 63 on which an internally threaded portion 62 is provided is formed at a substantially central portion of the three positioning projections 60 so as to project therefrom. In addition, a screw passage hole 42 is provided in a perpendicular front end wall surface of the unit mounting portion 20B, which extends in a cylindrical fashion from the perpendicular panel portion 20A of the low beam lamp bracket 20. As is shown in FIG. 4(a), a fastening screw 40 which is passed through the perpendicular front end wall surface from a back side of the unit mounting portion 20B is screwed into the internally threaded portion 62 of the boss 63, whereby the three positioning projections 60 on the back side of the shade 55 (the shade member 58) are brought into press contact with perpendicular front end abutment surfaces 20B1 lying at three corresponding locations on the unit mounting portions 20B, and the shade 55 is fastened to the unit mounting portions 20B in such a state that the optical axis Ax of the light source unit 50 (a longitudinal axis L2 of the reflector integrated shade 55) intersects the perpendicular front end abutment surface 20B1 (the perpendicular panel portion 20A) at right angles.

In addition, an LED assembly accommodation compartment 20B2 is formed on an upper surface of the unit mounting portion 20B of the perpendicular panel portion 20A. An opening 20B3 through which an LED assembly is to be inserted into and removed from the LED assembly accommodation compartment is provided in the perpendicular pane) portion 20A in a position facing the LED assembly accommodation compartment 20B2. In addition, when the LED assembly is accommodated in the LED assembly accommodation compartment 20B2 from the back side of the perpendicular panel portion 20A, the light emitting device 54 is positioned in the position of the primary focal point F1 of the reflector.

The projection lens 52 may be made, for example, from an acrylic resin and is fixedly integrated with a front end portion (hereinafter, referred to as a lens mounting portion) 550 of the reflector integrated shade 55 which is made, for example, from a polycarbonate resin or acrylic resin, by means of ultrasonic vibration welding. As is shown in FIG. 5, the projection lens 52 and the reflector integrated shade 55 are positioned so that an optical axis L1 of the projection lens 52 and the longitudinal axis L2 of the reflector integrated shade 55 align accurately (i.e., the projection lens 52 and the reflector integrated shade 55 are positioned vertically and horizontally).

Figure 5:
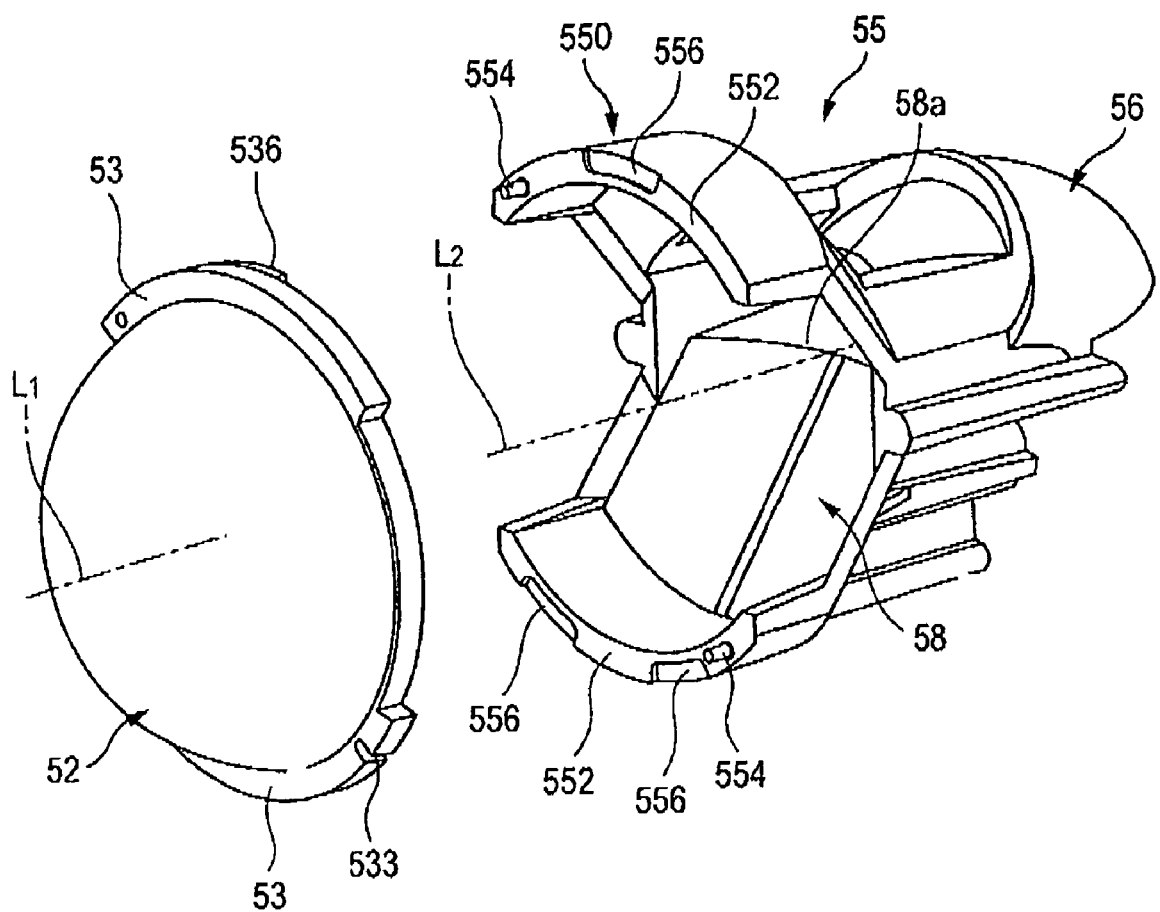
FIG. 5 shows an enlarged exploded perspective view of a light source unit.

As is shown in FIGS. 5, 6, 7(a), and 7(b), arc-shaped collar portions 53 are formed at two upper and lower locations along an outer circumference of the projection lens which lie diametrically across the optical axis L1 of the projection lens. Rear surfaces of the collar portions 53 each make up an abutment reference surface on the lens 52 which is perpendicular to the optical axis L1. On the other hand, as is shown in FIGS. 5 and 8, arc-shaped face bearing portions 552 are formed at a distal end of the lens mounting portion 550 so as to correspond to the collar portions 53, and the face bearing portions 552 each make up an abutment reference surface on the shade 55 side which is perpendicular to the longitudinal axis L2. Consequently, by bringing the rear surfaces (i.e., the abutment reference surfaces on the lens 52 side) of the collar portions 53 of the projection lens 52 into abutment with the face bearing portions 552 (i.e., the abutment reference surfaces on the shade 55 side), the optical axis L1 of the projection lens 52 and the longitudinal axis L2 of the reflector integrated shade 55 are positioned parallel to each other.

Figure 6:
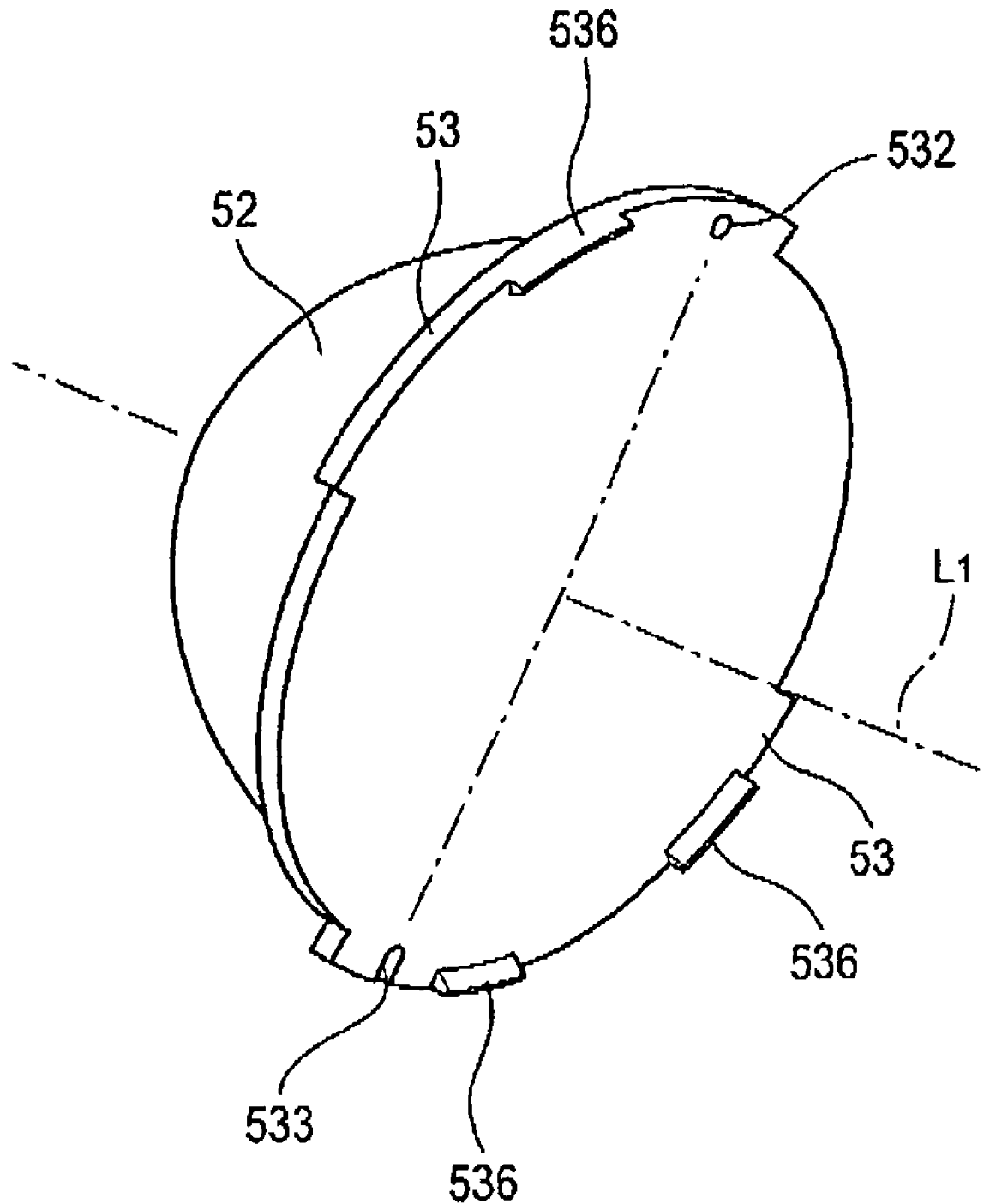
FIG. 6 shows a perspective view of a rear side of a projection lens which is a light distribution control member of a light source unit.
Figure 7:
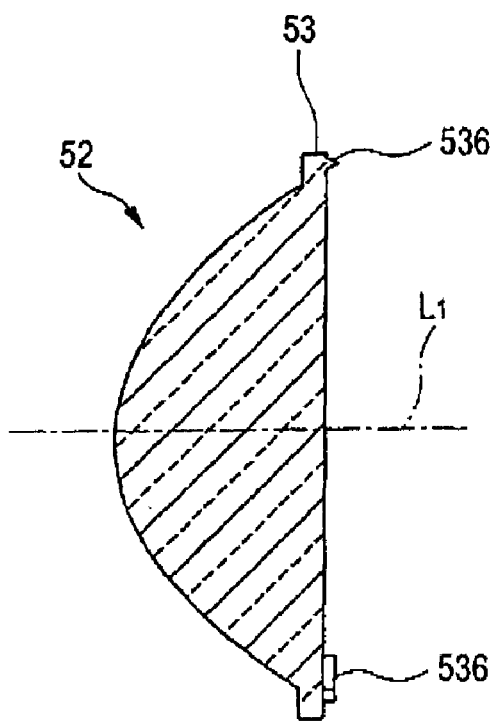
FIGS. 7(a) and 7(b) show a projection lens, FIG. 7(a) being a vertical sectional view of the projection lens (i.e., a sectional view taken along the line VII-VII shown in FIG. 7(b)) and FIG. 7(b) being a rear view of the projection lens.
Figure 7:
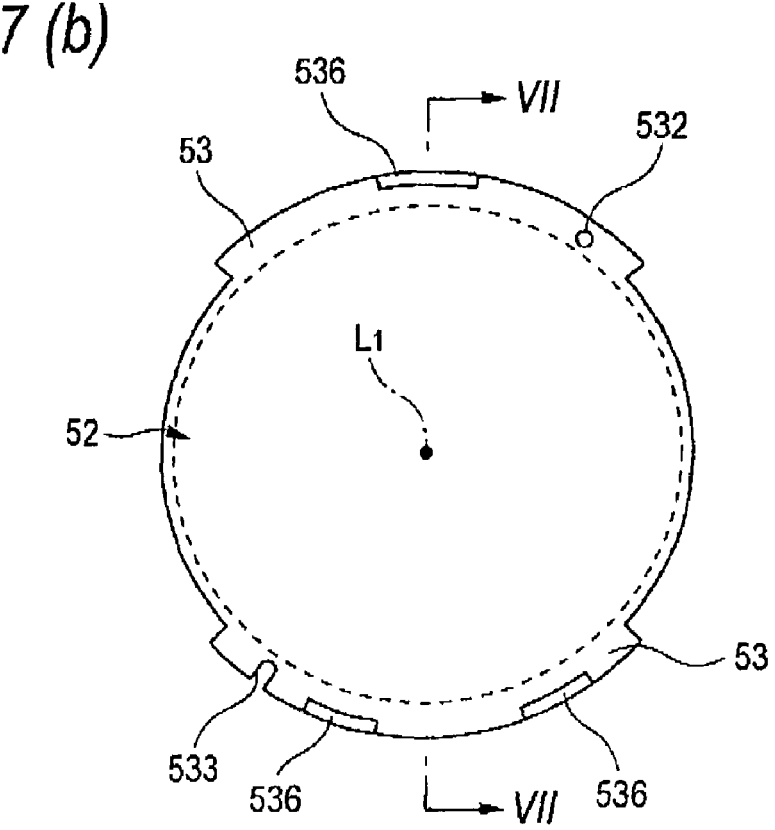
Figure 8:
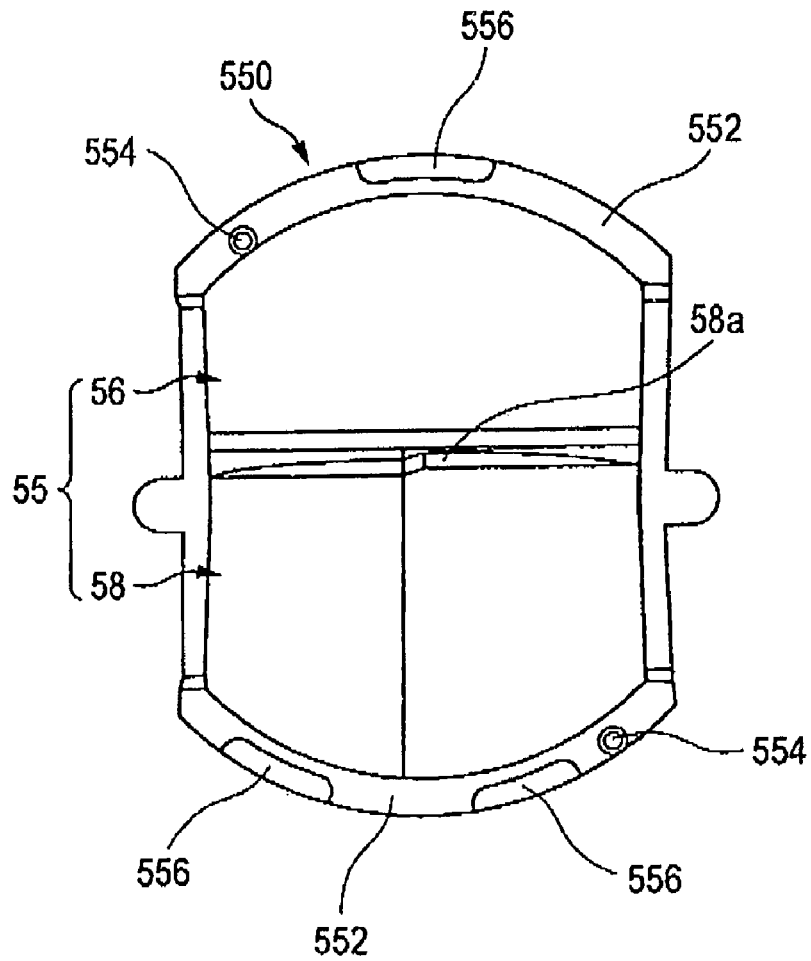
FIG. 8 shows a front view of a reflector integrated shade which is a light distribution control member of the light source unit.

In addition, as shown in FIGS. 5 and 8, a pair of projecting pins 554, 554 are provided, respectively, on the face bearing portions 552 of the lens mounting portion 550 so as to lie opposite diametrically across the longitudinal axis L2, and on the other hand, as is shown in FIGS. 6, 7, a pin engagement hole 532 and a slit 533, which correspond to the pair of projecting pins 554, 554, are provided, respectively, on the rear surfaces of the collar portions 53 of the projection lens so as to lie opposite diametrically across the optical axis L1. The pair of pins 554, 554 and the pin engagement hole 532 and the slit 533 make up a positioning means for aligning the optical axis L1 of the projection lens 52 with the longitudinal axis L2 of the reflector integrated shade 55. Namely, by bringing the pair of pins 554, 554 into engagement with the pin engagement hole 532 and the slit 533, respectively, the optical axis L1 of the projection lens 52 and the longitudinal axis L2 of the reflector integrated shade 55 are aligned with each other accurately, so that the optical axis L1 and the longitudinal axis L2 cooperate with each other to make up the optical axis Ax of the light source unit 50.

Although the positioning means for aligning the optical axis L1 of the projection lens 52 with the longitudinal axis L2 of the reflector integrated shade 55 can be made up of the pair of projecting pins 554, 554 and the pair of pin engagement holes 532, 532, the pair of projecting pins 554, 554 and the pair of pin engagement holes 532, 532 cannot be brought into proper engagement with each other if the positions of the projecting pins and the pin engagement holes deviate from each other even slightly. Therefore, a high dimensional accuracy is required for the pin projecting positions which lie diametrically opposite across the optical axis L1 of the projection lens and the pin engagement hole 532 forming positions which lie diametrically opposite across the longitudinal axis L2 of the lens mounting portion 550, which constricts the manufacturing conditions of the reflector integrated shade 55. On the other hand, in this preferred embodiment, one of the engagement holes with which the pair of projecting pins 554 are brought into engagement is made up of the slit 533 which extends in the radial direction. Since the projecting pin 554 and the slit 533 can slide in the radial direction of the projection lens 52 relative to each other when the projecting pin 554 is brought into engagement with the slit 533, the pin 554 and the pin engagement hole 532 can easily be brought into engagement with each other. Since a dimensional error of the pin 554 projecting positions and the pin engagement hole 532 forming positions in the radial direction of the projection lens 52 can be absorbed, the dimensional accuracy required for the pin projecting positions and the pin engagement hole forming positions is mitigated.

Figure 9:
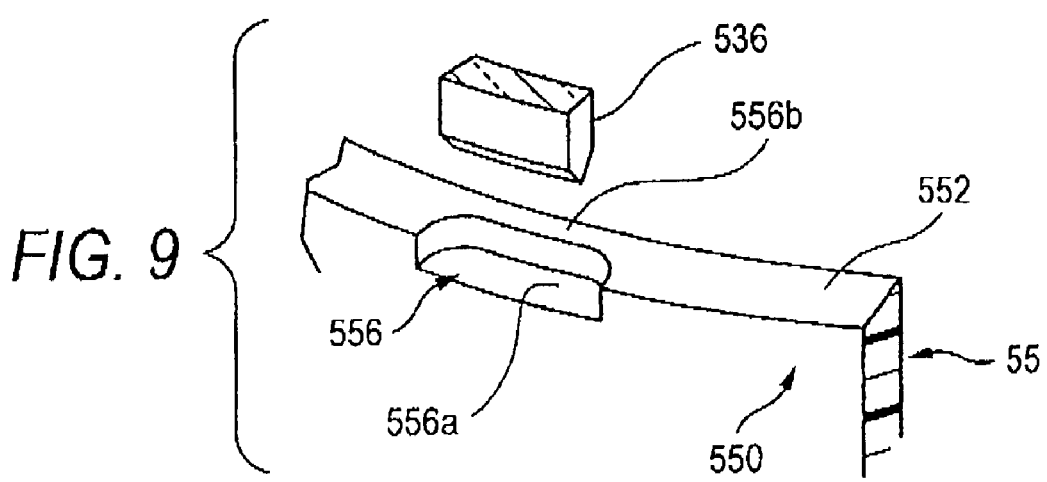
FIG. 9 shows an enlarged perspective view of a stepped portion formed on an outer circumferential side of a lens mounting portion of a reflector integrated shade.

In addition, as is shown in FIGS. 6 and 7, a rearward extending projection 536 is provided on the rear surface of each of the upper and lower collar portions 53 of the projection lens 52 closer to an outer circumference thereof so as to extend in an arc-like shape along the outer circumference of the collar portion 53, while as is shown in FIGS. 5, 8 and 9, a stepped portion 556 is provided on an outer circumference of the lens mounting portion 550 in a position which corresponds to the rearward extending projection 536 on the lens 52 side so that the rearward extending projection 536 can be brought into axial engagement therewith. As is shown in FIG. 10(a), the stepped portion 536 is formed to have a width d, which is slightly larger than a thickness t of the rearward extending projection 536 on the lens 52 side, and a depth (a longitudinal length) H, which is somewhat shallower than a longitudinal length h of the rearward extending projection 536. Due to this, a gap is formed around the rearward extending projection 536, in particular, between the rearward extending projection 536 and an erect wall 556b such that the rearward extending projection 536 is brought into engagement with the stepped portion 556.

The length of the projecting pin 554 is set to be somewhat larger than a difference (h–H) between the longitudinal length h of the rearward extending projection 536 and the depth (the longitudinal length) H of the stepped portion 556, so that distal end portions of the projecting pins 554, 554 can be brought into engagement with the pin engagement hole 532 and the slit 533, respectively, when the rearward extending projection 536 is brought into engagement with the stepped portion 556. When the distal end portions of the projecting pins 554, 55 4 are brought into engagement with the pin engagement hole 532 and the slit 533, the rearward extending projection 536 and the stepped portion 556 are automatically brought into engagement with each other.

The rearward extending projection 536 is ultrasonically welded to a welding surface 556a of the stepped portion 556 so that the rear surface of the collar portion 53 of the projection lens 52 is brought into abutment with the face bearing portion 552 of the lens mounting portion 550. A focal point f of the projection lens 52 is thereby aligned with the secondary focal point F2 of the reflector integrated shade 55 (i.e., of the reflector 56).

As shown in FIGS. 9 and 10(a), the erect wall 556b, which is an inner circumferential wall of the stepped portion 556 of the lens mounting portion 550, extends along an inside of the rearward extending projection 536 on the lens 52 side to function as a barrier for preventing resin, which is fused when the rearward projection 536 on the lens 52 side is welded to the stepped portion 556, from flowing out towards an optical axis L1 side of the projection lens 52. Preventing the flow of resin helps to avoid the protrusion (exposure) of burrs produced at a weld between the rearward extending projection 536 and the stepped portion 556 towards the optical side of the projection lens 52. Preventing the burr exposure avoids defects that could adversely affect the light distribution and cause the burrs at the weld to become visible through the projection lens 52.

Next, a process for welding and fixing the projection lens 52 to the reflector integrated shade 55 will be described based on FIG. 10.

Firstly, the reflector integrated shade 55 is set on a jig (not shown) so that the lens mounting portion 550 is oriented upwards. Then, the projection lens 52 is assembled to the lens mounting portion 550 so that the pin engagement hole 532 and the slit 533 on the lens 52 side are brought into engagement with the distal end portions of the projecting pins 554, 554 on the lens mounting portion 550 side. As this occurs, as is shown in FIG. 10(a), a state results in which the rearward extending projection 536 on the lens 52 side is brought into engagement with the stepped portion 556 on the lens mounting portion 550 side, whereby a distal end of the rearward extending projection 536 is brought into abutment with the welding surface 556a of the stepped portion 556. Following this, a cut-type horn 100 is lowered from above the projection lens 52, whereby an annular lower end portion of the horn 100 presses against the collar portion 53 of the projection lens 52, and the rearward extending projection 536 is held contacting the welding surface 556a of the stepped portion 556 under pressure. Then, ultrasonic vibrations are transmitted to the collar portion 53 via the horn 100 while keeping the rearward extending projection 536 in contact with the welding surface 556a of the stepped portion 556 under pressure. A press contact portion between the rearward extending projection 536 and the welding surface 556a of the stepped portion 556 which receives ultrasonic vibration energy is fused, and a fused distal end portion of the rearward extending projection 536 is coalesced with the welding surface 556a of the stepped portion 556 which is similarly fused so that the rearward extending projection 536 and the stepped portion 556 are welded together. However, as is shown in FIG. 10(b), since the rearward extending projection 536 on the projection lens 52 side and the welding surface 556a of the stepped portion 556 are held pressed against each other until the collar portion 53 and the face bearing portion 552 reach the abutment position where they are brought into abutment with each other, the projection lens 52 and the lens mounting portion 550 (the reflector integrated shade 55) can be welded together axially (longitudinally) with good positional accuracy over a short period of time into an integrated unit. During the process in which the extending projection 536 on the lens 52 side is welded to the stepped portion 536, the erect wall 556b of the stepped portion 556 which extends along the inside of the extending projection 536 functions as the barrier for preventing the fused resin from flowing out towards the optical axis L1 side of the projection lens 52, whereby the protrusion (exposure) of burrs produced at the weld between the extending projection 536 and the stepped portion 556 is prevented.

In addition, of the light source units 70 which are positioned at the two upper and lower locations to make up the bending lamp C, in the upper light source unit 70A, an optical axis thereof is inclined slightly outwards in the transverse direction of the vehicle so as to form a light distribution pattern which illuminates widely a diagonally front area of the vehicle, whereas in the lower light source unit 70B, an optical axis thereof is inclined largely outwards in the transverse direction of the vehicle so as to form a light distribution pattern which illuminates a limited area lying in a more diagonally front area of the vehicle.

Additionally, the light source unit 30 which makes up the high beam lamp A includes, as is shown in FIGS. 1 and 2, the resin projection lens 32 which is a light distribution control member disposed on an optical axis A'x, the light emitting device 34 (e.g., a white light emitting diode) which is the light source disposed on the unit mounting portion provided on the bracket 18A so as to be oriented upwards, a resin reflector 36 which is a light distribution control member disposed so as to cover the light emitting device 34 from above, and a resin lens holder 38 disposed between the light emitting device 34 and the projection lens 32.

As to the lens holder 38 making up the light source unit 30, as with the reflector integrated shade 55 which makes up the light source unit 50, the reflector 36 and the lens holder 38 are made into a reflector integrated lens holder 35 which is an integrated mold product of a polycarbonate resin or acrylic resin, for example. In addition, a positioning means (e.g., pin engagement holes and rearward extending projections on the projection lens side and projecting pins and stepped portions on the lens holder 35 side) which is similar to that provided between the reflector integrated shade 55 and the projection lens 52 of the light source unit 50 is provided between a distal end portion of the reflector integrated lens holder 35 and a collar portion of the projection lens 32, and the acrylic resin projection lens 32 is integrated with a distal end of the reflector integrated lens holder 35 by means of ultrasonic vibration welding.

In the above preferred embodiment, the pin engagement hole 532 and the slit 533 are provided on the side of the projection lens 52 to correspond to the pair of projecting pins 554 provided on the side of the lens mounting portion 550 as the vertical and horizontal positioning means between the projection lens 52 and the reflector integrated shade 55. In another embodiment an elongated hole may be provided in place of the slit 533. In addition, a pair of pin engagement holes 532 may be provided on the side of the lens mounting portion 550 to correspond to the pair of projecting pins 554 provided on the side of the projection lens 52.

The above preferred embodiment is configured such that the projection lens 52 and the lens mounting portion 550 are positioned relative to each other so that the optical axis L1 of the projection lens is substantially aligned with the longitudinal axis L2 of the lens mounting portion 550 and welded integrally by the rearward extending projections 536 which are provided at the three locations (one upper and two lower locations) and the stepped portions 556 which are provided at the three locations which correspond to the projections 536, respectively. In another embodiment, the rearward extending projections 536 and the corresponding stepped portions 556 may be provided so as to lie at three locations which are situated circumferentially at substantially equal intervals, respectively, which will further ensure the fixing of the projection lens 52 to the lens mounting portion 550, and ensure the parallelism between the optical axis L1 of the projection lens 52 and the longitudinal axis L2 of the lens mounting portion 550. The longitudinal positioning of the focal point f of the projection lens 52 and the predetermined position on the lens mounting portion 550 side is secured further, so that a more desired light distribution (for example, a light distribution having a clear cut-off line which corresponds to the low beam forming shade) can be obtained by the light source unit 50.

Additionally, while in the above preferred embodiment, the rearward extending projections 536 and the stepped portions 556 are provided at the three locations, respectively, a configuration may be adopted in which the rearward extending projections 536 and the stepped portions 556 are provided at two locations which lie opposite diametrically to face each other across the optical axis L1 (the longitudinal axis L2).

Figure 11:
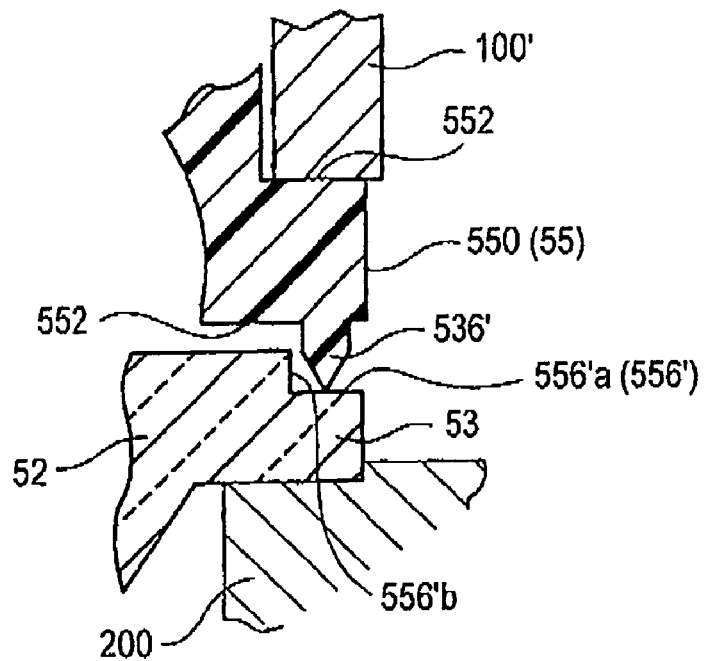
FIGS. 11(a) and 11(b) are explanatory diagrams which show a process of welding a projection lens according to another embodiment of the invention, FIG. 11(a) being an enlarged sectional view showing an engagement portion between a forward extending projection and a stepped portion right before the start of an ultrasonic vibration welding process, FIG. 11(b) being an enlarged sectional view showing the engagement between the forward extending projection and the stepped portion at the completion of the ultrasonic vibration welding process.
Figure 11:
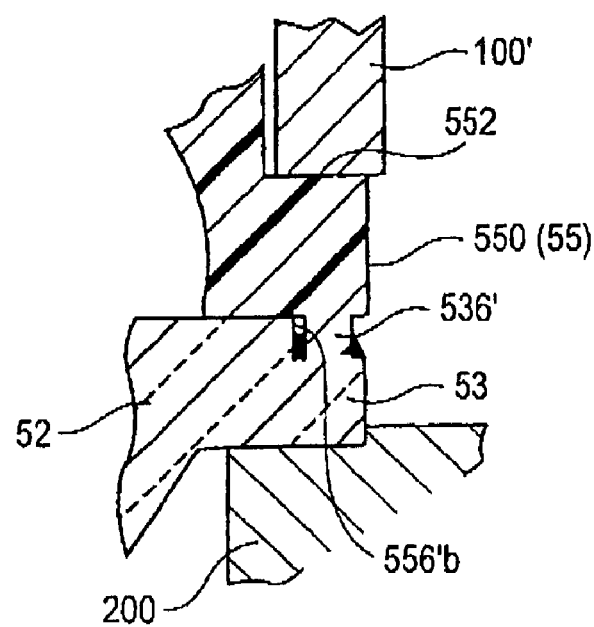
Figure 12:
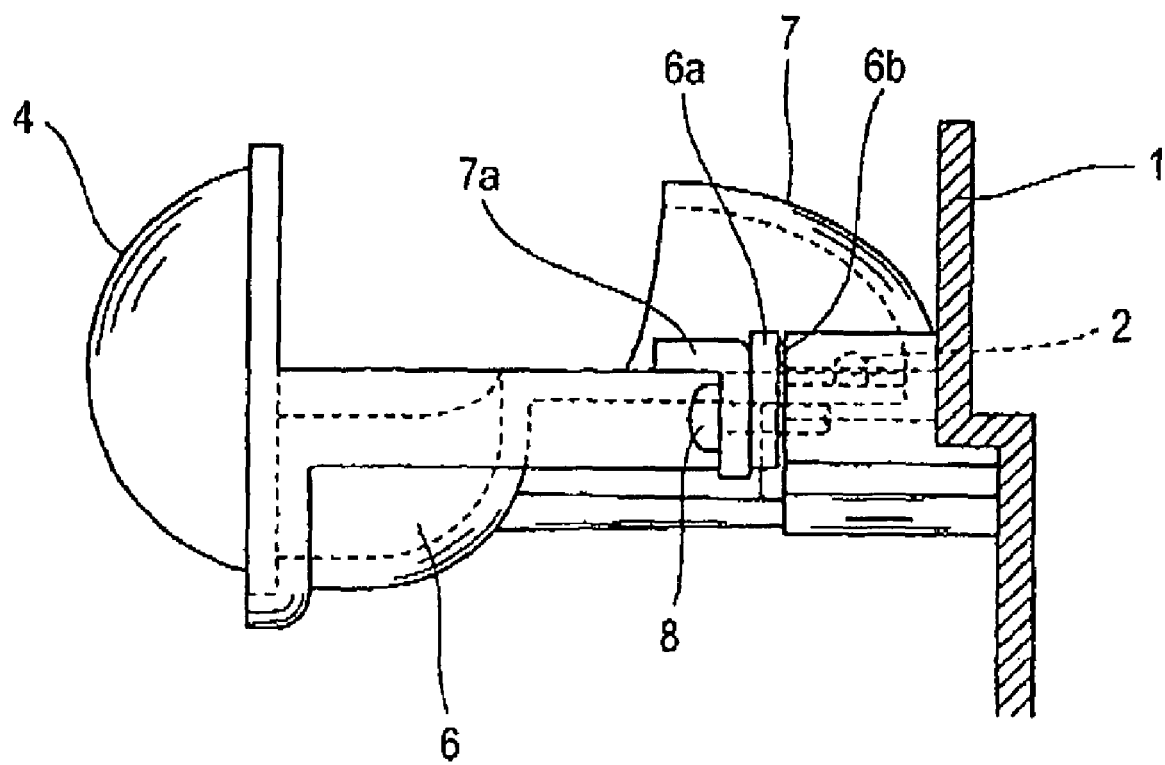
FIG. 12 shows a vertical sectional view of a light source unit of a background automotive headlamp.

While in the above preferred embodiment, the plurality of rearward extending projections 536 are provided on the back sides of the collar portions 53 of the projection lens 52 and the stepped portions 556 are formed on the face bearing portions 552 of the lens mounting portion 550 so that the extending projections 536 can be brought into engagement therewith, another embodiment may be adopted in which as is shown in FIG. 11(*a*), a plurality of forward extending projections 536' are provided on face bearing portions 552 of a lens mounting portion 550, while stepped portions 556' are provided on back sides of collar portions 53 of a projection lens 52 so that the extending projections 536' can be brought into engagement therewith. In other regards, the relevant configuration is similar to the configuration realized by the lens mounting portion 550 and the projection lens 52 in the first embodiment above, and hence, the repetition of that description is omitted here.

FIGS. 11(*a*) and 11(*b*) are explanatory diagrams according to another embodiment of the invention. FIG. 11(*a*) is an enlarged sectional view showing an engagement portion between the forward extending projection 536' and the stepped portion 556' right before the start of an ultrasonic vibration welding process, and FIG. 11(*b*) is an enlarged sectional view showing the engagement between the forward extending projection 536' and the stepped portion 556' at the completion of the ultrasonic vibration welding process.

Figure 10:
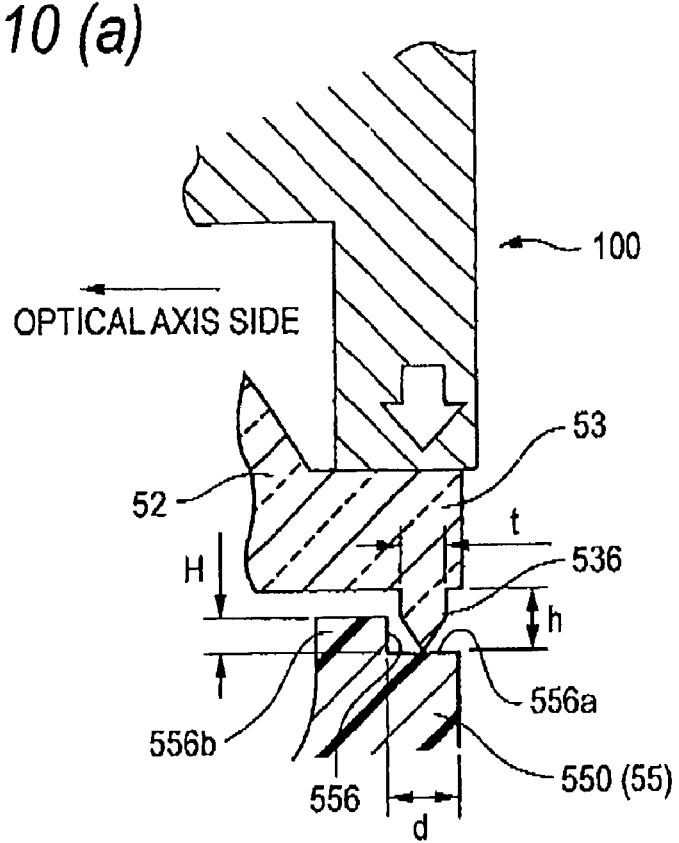
FIGS. 10(a) and 10(b) are explanatory diagrams which show a process of welding a projection lens to the lens mounting portion, FIG. 10(a) being an enlarged sectional view showing an engagement between a rearward extending projection and a stepped portion before the start of ultrasonic vibration welding process, FIG. 10(b) being an enlarged sectional view of an engagement between a rearward extending projection and a stepped portion at the completion of the ultrasonic vibration welding process.
Figure 10:
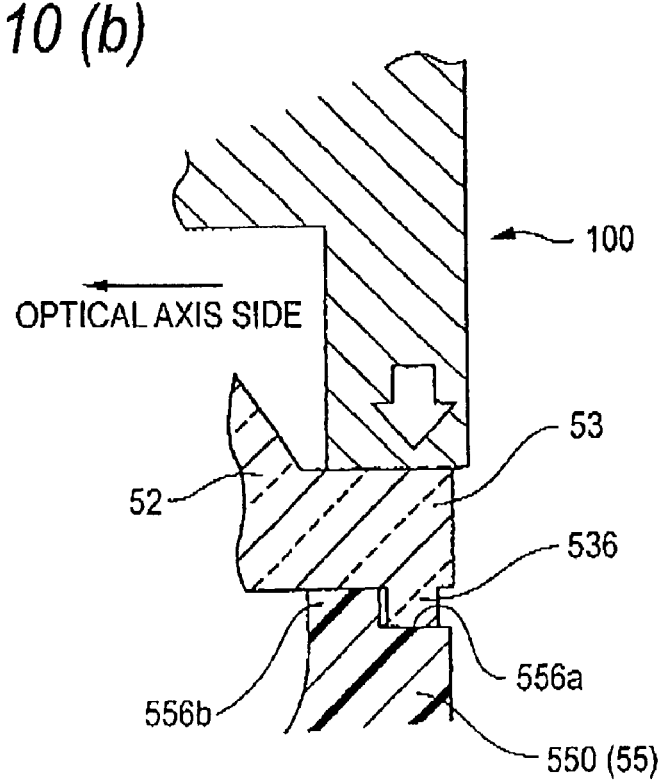

The welding process for fixing the projection lens 52 to a reflector integrated shade 55 differs from the process of the first embodiment (refer to FIGS. 10(*a*), (*b*)). As is shown in FIG. 11(*a*), the reflector integrated shade 55 is assembled from above to the projection lens 52, which is set on a jig so that a rear surface side thereof is oriented upwards. Then, a cup-type horn engagement annular notch (stepped portion) 552 is formed on an outer circumference of the lens mounting portion 550 of the reflector integrated shade 55 so as to extend along the forward extending projection 536'. A cup-type horn 100' is brought into engagement with the notch (stepped portion) so as to cover the reflector integrated shade 55 from above, ultrasonic vibrations are transmitted to the forward extending projection 536' via the horn 100' while causing the forward extending projection 536' to be pressed against a welding surface 556'*a* of the stepped portion 556', whereby as is shown in FIG. 11'*b*), the forward extending projection 536' and the stepped portion 556' are welded integrally in a position where a rear face (back side) of the collar portion 53 is brought into abutment with the face bearing portion 552. Also, in the process shown in FIGS. 11(*a*) and 11(*b*), during the process in which tie extending projection 536' on the face bearing portion 552 side of the lens mounting portion 550 is welded to the stepped portion 556' of the lens 52, an erect wall 556'*b* on the stepped portion 556' which extends along an inside of the extending projection 536' functions as a barrier for preventing fused resin from flowing out towards an optical axis L1 side of the projection lens 52 to thereby avoid the protrusion (exposure) of burrs produced at the weld between the extending projection 536' and the stepped portion 556' towards the optical axis side of the projection lens 52.

In addition, in either of the two embodiments (FIGS. 10(a), (b) and FIGS. 11(a), (b)) that have been described heretofore, the vertical and horizontal positioning means between the projection lens 52 and the lens mounting portion 550 (i.e., the positioning means for aligning the optical axis L1 of the projection lens 52 with the longitudinal axis L2 of the reflector integrated shade 55 with high accuracy) are made up of the pair of projecting pins 554 which are provided on the face bearing portions 552 of the lens mounting portion 550 and the pin engagement hole 532 and the slit 533 which are provided on the rear surface side of the collar portions 53 of the projection lens 52. Since the three extending projections 536 (526') on the projection lens 52 (or the lens mounting portion 550) side and the corresponding stepped portions 566 (556') on the lens mounting portion 550 (or the projection lens 52) side function as the positioning means for substantially aligning the optical axis L1 of the projection lens 52 with the longitudinal axis L2 of the reflector integrated shade 55 vertically and horizontally, the vertical and horizontal positioning means which is made up of the projecting pins 554 and the pin engagement holes 532 (including the slit 533) is not necessarily required.

When the plurality of extending projections 536 (536') on the projection lens 52 (or the lens mounting portion 550) side and the corresponding stepped portions 556 (556') on the lens mounting portion 550 (or the projection lens 52) side are brought into axial (longitudinal) engagement with each other, respectively, the focal point f of the projection lens 52, the secondary focal point F2 of the reflector 56 and the cut-off line forming upper edge portion 58a can be substantially aligned with each other in the vertical and horizontal directions, but they cannot always be aligned with each other accurately. In forming a light distribution having a clear cut-off line which corresponds to the cut-off line forming shade member 58 (the cut-off line forming upper edge portion 58a) by the light source unit 50, however, as long as at least the optical axis L1 of the projection lens 52 and the longitudinal axis L2 of the lens mounting portion 550 are parallel and the focal point f of the projection lens 52, the secondary focal point F2 of the reflector 56 and the cut-off line forming upper edge portion 58a are aligned with each other axially (longitudinally), there will be no serious problem even if the focal point f of the projection lens 52, the secondary focal point F2 of the reflector 56 and the cut-off line forming upper edge portion 58a deviate from each other somewhat vertically and/or horizontally.

Although the invention has been described above with respect to preferred embodiments, those skilled in the art, having benefit of this disclosure, will appreciate that other embodiments can be devised which do not depart from the spirit and scope of the invention as disclosed and claimed herein, and such modifications are intended to fall within the scope of the appended claims.

What is claimed is:

1. A vehicle lighting device, comprising:
a lamp compartment;
a light source unit comprising a light emitting device as a light source and a projection lens as a light distribution control member for distributing light from said light source forwards, wherein said light source unit is disposed in said lamp compartment and said projection lens is made from a resin and mounted on a lens mounting portion made from a resin, said lens mounting portion extending forward from said light emitting device,
wherein a face bearing portion is disposed at a distal end of said lens mounting portion so as to correspond to a rear surface of a collar portion disposed along an outer circumference of said projection lens,
wherein a plurality of extending projections are provided on an outer circumferential side of one of the rear surface of said collar portion and said face bearing portion and a plurality of stepped portions are disposed on an outer circumferential side of the other of the rear surface of said collar portion and said face bearing portion, said stepped portions axially engaging said plurality of extending projections with an optical axis of said projection lens aligned substantially with a longitudinal axis of said lens mounting portion and forming erect walls which lie between the optical axis and said extending projections,
wherein said extending projections and said stepped portions are welded together with the rear surface of said collar portion and said face bearing portion in longitudinal abutment with each other, and
whereby any burrs, produced from the extending projections and the stepped portions during the welding when the tip of each extending projection is pressed, are prevented from flowing out toward an optical axis of the projection lens by the erect walls.

2. The vehicle lighting device as set forth in claim 1, wherein said extending projections and said stepped portions are both disposed at substantially equal intervals in a circumferential direction of said projection lens.

3. The vehicle lighting device as set forth in claim 2, wherein a pair of vertical and horizontal positioning projecting pins is provided on one of the rear surface of said collar portion and said face bearing portion so as to extend axially and a pair of corresponding engagement holes is provided on said other of the rear surface of said collar portion and said face bearing portion, said projecting pins and said engagement holes being positioned substantially diametrically across said optical axis of said projection lens or said longitudinal axis of said lens mounting portion.

4. The vehicle lighting device as set forth in claim 3, wherein said extending projection and said stepped portion are fixed together axially by ultrasonic welding, by which said collar portion and said face bearing portion reach an abutment position where they are brought into abutment with each other by holding said extending projection which is slightly longer than a longitudinal length of said stepped portion and a welding surface of said stepped portion in contact with each other under pressure in said longitudinal direction.

5. The vehicle lighting device as set forth in claim 2, wherein said extending projection and said stepped portion are fixed together axially by ultrasonic welding, by which said collar portion and said face bearing portion reach an abutment position where they are brought into abutment with each other by holding said extending projection which is slightly longer than a longitudinal length of said stepped portion and a welding surface of said stepped portion in contact with each other under pressure in said longitudinal direction.

6. The vehicle lighting device as set forth in claim 1, wherein a pair of vertical and horizontal positioning projecting pins is provided on one of the rear surface of said collar portion and said face bearing portion so as to extend axially and a pair of corresponding engagement holes is provided on the other of the rear surface of said collar portion and said face bearing portion, said projecting pins and said engagement holes being positioned substantially diametrically across said optical axis of said projection lens or said longitudinal axis of said lens mounting portion.

7. The vehicle lighting device as set forth in claim 6, wherein said extending projection and said stepped portion are fixed together axially by ultrasonic welding, by which said collar portion and said face bearing portion reach an abutment position where they are brought into abutment with each other by holding said extending projection which is slightly longer than a longitudinal length of said stepped portion and a welding surface of said stepped portion in contact with each other under pressure in said longitudinal direction.

8. The vehicle lighting device as set forth in claim 1, wherein said extending projection and said stepped portion are fixed together axially by ultrasonic welding, by which said collar portion and said face bearing portion reach an abutment position where they are brought into abutment with each other by holding said extending projection which is slightly longer than a longitudinal length of said stepped portion and a welding surface of said stepped portion in contact with each other under pressure in said longitudinal direction.

9. A method of manufacturing a vehicle lighting device, wherein the vehicle lighting device comprises a reflector integrated shade comprising a lens mounting portion and a projection lens, wherein the lens mounting portion comprises projecting pins and the projection lens comprises a pin engagement hole and a slit, or vice versa, the method comprising:

engaging the pin engagement hole and the slit with the projecting pins, wherein simultaneously an extending projection of the projection lens or the lens mounting portion is brought into engagement with a stepped portion of the other of the projection lens or the lens mounting portion, so that a distal end of the rearward extending projection abuts a welding surface of the stepped portion; and transmitting ultrasonic vibrations to a collar portion of either the projection lens or the lens mounting portion while keeping the distal end of the rearward extending projection in contact with the welding surface of the stepped portion under pressure until a press contact portion between the rearward extending projection and the welding surface of the stepped portion are fused and the rearward extending projection is coalesced with the welding surface of the stepped portion.

10. A method of manufacturing a vehicle lighting device, wherein the vehicle lighting device comprises a projection lens and a reflector integrated shade, wherein one of the projection lens and the reflector integrated shade comprises a plurality of extending projections and the other of the projection lens and the reflector integrated shade comprises a plurality of corresponding stepped portions the method comprising:

transmitting ultrasonic vibrations to the forward extending projection via a collar portion of the projection lens or a face bearing portion of the reflector integrated shade while pressing a tip of each of the extending projections against a welding surface of the corresponding stepped portion until the collar portion abuts against the face bearing portion, wherein the projection lens and the reflector integrated shade are welded integrally together by the ultrasonic vibrations, and whereby burrs produced from the extending projections and the stepped portions during the welding are prevented from flowing out toward an optical axis of the projection lens and the reflector integrated shade by an erect wall of each of the stepped portions which lies between the optical axis and the extending projection.

* * * * *